United States Patent [19]
Andrew

[11] Patent Number: 6,121,964
[45] Date of Patent: *Sep. 19, 2000

[54] METHOD AND SYSTEM FOR AUTOMATIC PERSISTENCE OF CONTROLS IN A WINDOWING ENVIRONMENT

[75] Inventor: Felix GTI Andrew, Seattle, Wash.

[73] Assignee: Microsoft Corporation, Redmond, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 08/762,237

[22] Filed: Dec. 9, 1996

[51] Int. Cl.⁷ .............................. G06F 15/00; G06F 3/00

[52] U.S. Cl. ........................................... 345/333; 345/340

[58] Field of Search ................................. 345/333, 335, 345/339, 340, 347, 346

[56] References Cited

U.S. PATENT DOCUMENTS

| | | | |
|---|---|---|---|
| 4,899,136 | 2/1990 | Beard et al. | 345/156 |
| 5,371,675 | 12/1994 | Greif et al. | 345/340 |
| 5,546,525 | 8/1996 | Wolf et al. | 345/346 |
| 5,563,997 | 10/1996 | Fisher | 345/347 |
| 5,623,591 | 4/1997 | Cseri | 345/326 |
| 5,651,108 | 7/1997 | Cain et al. | 345/340 |
| 5,694,561 | 12/1997 | Malamud et al. | 345/346 |
| 5,745,712 | 4/1998 | Turpin et al. | 345/333 |
| 5,815,703 | 9/1998 | Copeland et al. | 345/332 |
| 5,838,317 | 11/1998 | Bolnick et al. | 345/339 |
| 5,844,554 | 12/1998 | Geller et al. | 345/333 |

OTHER PUBLICATIONS

Barkakati, Naba, *Visual C++2, Developer's Guide, 2nd Edition*, Sams Publishing, Indianapolis, IN, 1995, pp. 408–421, 903–909.

Microsoft Corporation, "Simple MAPI Structures." http://premium.microsoft.com/msdn/library/sdkdoc/mapi/groups_7wab.htm. [Accessed Aug. 19, 1998].

Microsoft Corporation, "MapiFile Desc (Simple MAPI)." http://premium.microsoft.com/msdn/library/sdkdoc/mapi/smapiref_671b.htm. [Accessed Aug. 19, 1998].

Microsoft Corporation, "MapiMessage (Simple MAPI)." http://premium.microsoft.com/msdn/library/sdkdoc/mapi/smapiref_6n1b.htm. [Accessed Aug. 19, 1998].

Microsoft Corporation, "MapiRecipDesc Simple MAPI)." http://premium.microsoft.com/msdn/library/sdkdoc/mapi/smapiref_13tr.htm. [Accessed Aug. 19, 1998].

Microsoft Corporation, "MAPI Design Issues to Consider." http://premium.microsoft.com/win32dev/mapi/issues.htm. [Accessed Aug. 19, 1998].

Microsoft Corporation, "Using MAPI from a Windows NT Service." http://www.microsoft.com/WIN32DEV/MAPI/MAPISERV.HTM. [Accessed Aug. 19, 1998].

(List continued on next page.)

*Primary Examiner*—Raymond J. Bayerl
*Assistant Examiner*—Cao H. Nguyen
*Attorney, Agent, or Firm*—Klarquist Sparkman Campbell Leigh & Whinston, LLP

[57] ABSTRACT

A computer system for persistently storing information entered by a user into an edit control of a property page. In a preferred embodiment, the computer system has a registry for storage of information identified by a key. An application program has a resource file that contains a definition of controls for the property page. The controls include the edit control designated as editable by the user and a buddy control that is adjacent to the edit control, that is designated as not visible, and that has text which specifies a key within the registry. The computer system displays the property page by detecting that the buddy control is adjacent to the edit control and is designated as not visible, by retrieving the text for the buddy control, by retrieving information from the registry using the key specified by the retrieved text, and by initializing the edit control to the retrieved information. The computer system also allows a user to modify the information of the edit control and then stores the modified information of the edit control in the registry using the key specified by the retrieved text to effect persistent storage of the information for the edit control in the registry.

32 Claims, 17 Drawing Sheets

OTHER PUBLICATIONS

Microsoft Corporation, "MAPI Deviations from COM Rules," http://www.microsoft.com/WIN32DEV/MAPI/MAPICOM.HTM. [Accessed Aug. 19, 1998].

Microsoft Corporation, "The Rules of the Component Object Model," http://www.microsoft.com/OLEDEV/OLECOM/THE_RU.HTM. [Accessed Aug. 19, 1998].

Microsoft Corporation, "Optional Features in MAPI Message Services," http://www.microsoft.com/WIN32DEV/MAPI/OPTIONAL.HTM. [Accessed Aug. 19, 1998].

Microsoft Corporation, "Database Options in AppWizard," http://premium.microsoft.com/msdn/library/devprods/vc++/progsguide/FA/D12/S1E55F.HTM. [Accessed Aug. 19, 1998].

Microsoft Corporation, "Class Wizard: Creating a Recordset Class," http://premium.microsoft.com/msdn/library/devprods/vc++/progsguide/F26/D2B/S23AC.HTM. [Accessed Aug. 19, 1998].

Microsoft Corporation, "How to Update User–Interface Objects," http://premium.microsoft.com/msdn/library/devprods/vc++/progsguide/F1F/D24/S54DA.HTM. [Accessed Aug. 19, 1998].

Microsoft Corporation, "Adding a Message Handler," http://premium.microsoft.com/msdn/library/devprods/vc++/progsguide/F26/D2B/S478C7.HTM. [Accessed Aug. 19, 1998].

Microsoft Corporation, "Class Wizard: Adding Automation Properties and Methods," http://premium.microsoft.com/msdn/library/devprods/vc++/progsguide/F26/D2B/S23B8.HTM. [Accessed Aug. 19, 1998].

Microsoft Corporation, "Class Wizard: Accessing Automation Servers," http://premium.microsoft.com/msdn/library/devprods/vc++/progsguide/F26/D2B/S4CD79.HTM8. [Accessed Aug. 19, 1998].

Microsoft Corporation, "ActiveX Controls: Adding Stock Methods to an ActiveX Control," http://premium.microsoft.com/msdn/library/devprods/vc++/progsguide/F1F/D24/S533D.HTM. [Accessed Aug. 19, 1998].

Microsoft Corporation, "ActiveX Controls: Adding Stock Events to an ActiveX Control," http://premium.microsoft.com/msdn/library/devprods/vc++/progsguide/F1F/D24/S5333.HTM. [Accessed Aug. 19, 1998].

Microsoft Corporation, "Create an MFC EXE Program with App Wizard," http://premium.microsoft.com/msdn/library/devprods/vc++/progsguide/FA/DD/S10AC2.HTM. [Accessed Aug. 19, 1998].

Microsoft Corporation, "The MFC AppWizard (EXE version): Step–by–Step," http://premium.microsoft.com/msdn/library/devprods/vc++/progsguide/FA/DD/S4D2A3.HTM. [Accessed Aug. 19, 1998].

Microsoft Corporation, "Creating a New Application with AppWizard," http://premium.microsoft.com/msdn/library/devprods/vc++/tutorials/d4/s5a64.htm. [Accessed Aug. 19, 1998].

Microsoft Corporation, "Create an MFC DLL with AppWizard," http://premium.microsoft.com/msdn/library/devprods/VC++/Progsguide/FA/DE/SB120.HTM. [Accessed Aug. 19, 1998].

Microsoft Corporation, "Overview: Beginning Your Program," http://premium.microsoft.com/msdn/library/devprods/vc++/progsguide/FA/DC/S10849.HTM. [Accessed Aug. 19, 1998].

Microsoft Corporation, "Creating a Visual C++ Program," http://premium.microsoft.com/msdn/library/devprods/vc++/progsguide/FA/DC/S4CFB6.HTM. [Accessed Aug. 19, 1998].

Microsoft Corporation, "What is a Visual C++ Project?" http://premium.microsoft.com/msdn/library/devprods/vc++/progsguide/FA/DC/S4CFB7.HTM. [Accessed Aug. 19, 1998].

Microsoft Corporation, "How do I Begin My Visual C++ Program?" http://premium.microsoft.com/msdn/library/devprods/vc++/progsguide/FA/DC/S4CFBA.HTM. [Accessed Aug. 19, 1998].

Microsoft Corporation, "Classes and Functions AppWizard Generates for MFC DLLs," http://premium.microsoft.com/msdn/library/devprods/vc++/progsguide/FA/DE/S4D2A8.HTM. [Accessed Aug. 19, 1998].

Microsoft Corporation, "Using ClassWizard," http://premium.microsoft.com/msdn/library/devprods/vc++/progsguide/F26/D2B/S2C126.HTM. [Accessed Aug. 19, 1998].

Microsoft Corporation, "Working with Classes Tasks," http://premium.microsoft.com/msdn/library/devprods/vc++/progsguide/F26/D29/S2746E.HTM. [Accessed Aug. 19, 1998].

Microsoft Corporation, "Class Wizard: Overview," http://premium.microsoft.com/msdn/library/devprods/vc++/Progsguide/F26/D28/S4CD96.HTM. [Accessed Aug. 19, 1998].

Microsoft Corporation, "Working with Classes: Overview," http://premium.microsoft.com/msdn/library/devprods/vc++/progsguide/F26/D28/S24AFF.HTM. [Accessed Aug. 19, 1998].

Microsoft Corporation, "Class View: Overview," http://premium.microsoft.com/msdn/library/devprods/vc++/progsguide/F26/D28/S4CD94.HTM. [Accessed Aug. 19, 1998].

Microsoft Corporation, "WizardBar: Overview," http://premium.microsoft.com/msdn/library/devprods/vc++/progsguide/F26/D28/S4CD95.HTM. [Accessed Aug. 19, 1998].

Microsoft Corporation, "ClassWizard: Overview," http://premium.microsoft.com/msdn/library/devprods/vc++/progsguide/F26/D28/S4CD96.HTM. [Accessed Aug. 19, 1998].

Microsoft Corporation, "MFC: Overview," http://premium.microsoft.com/msdn/library/devprods/vc++/progsguide/F26/D28/S281D.HTM. [Accessed Aug. 19, 1998].

Microsoft Corporation, "Adding a Class," http://premium.microsoft.com/msdn/library/devprods/vc++/progsguide/F26/D2B/S11CD1.HTM. [Accessed Aug. 19, 1998].

Microsoft Corporation, "Importing a Class into ClassWizard," http://premium.microsoft.com/msdn/library/devprods/vc++/progsguide/F26/D2B/S4CD6B.HTM. [Accessed Aug. 19, 1998].

Microsoft Corporation, "Importing the Elements of a Type Library," http://premium.microsoft.com/msdn/library/devprods/vc++/progsguide/F26/D2B/S4CD6D.HTM. [Accessed Aug. 19, 1998].

Microsoft Corporation, "Mapping Messages to Functions," http://premium.microsoft.com/msdn/library/devprods/vc++/progsguide/F26/D2B/S2381.HTM. [Accessed Aug. 19, 1998].

Microsoft Corporation, "Overriding a Virtual Function," http://premium.microsoft.com/msdn/library/devprods/vc++/progsguide/F26/D2B/S4CD7F.HTM. [Accessed Aug. 19, 1998].

Microsoft Corporation, "Defining a Message Handler for a Reflected Message," http://premium.microsoft.com/msdn/library/devprods/vc++/progsguide/F26/D2B/S4CD85.HTM. [Accessed Aug. 19, 1998].

Microsoft Corporation, "Defining Member Variables for DDX," http://premium.microsoft.com/msdn/library/devprods/vc++/progsguide/F26/D2B/S4CD6E.HTM. [Accessed Aug. 19, 1998].

Microsoft Corporation, "Shortcut for Defining Member Variables for Dialog Controls," http://premium.microsoft.com/msdn/library/devprods/vc++/progsguide/F26/D2B/S4CD82.HTM. [Accessed Aug. 19, 1998].

Microsoft Corporation, "Editing a Message Handler," http://premium.microsoft.com/msdn/library/devprods/vc++/progsguide/F26/D2B/S4CD84.HTM. [Accessed Aug. 19, 1998].

Microsoft Corporation, "ClassWizard: Creating a Recordset Class," http://premium.microsoft.com/msdn/library/devprods/vc++/progsguide/F26/D2B/S23AC.HTM. [Accessed Aug. 19, 1998].

Microsoft Corporation, "ClassWizard: Creating a Database Form," http://premium.microsoft.com/msdn/library/devprods/vc++/Progsguide/F26/D2B/S4CD77.HTM. [Accessed Aug. 19, 1998].

Microsoft® Windows™ Version 3.1 Guide to Programming, pp. 40–43, 163–188, 190–195, Microsoft Corporation, 1992.

Microsoft® Windows™ Version 3.1 Programmer's Reference vol. 1: Overview, pp. 48–58, 122, Microsoft Corporation, 1992.

METHOD AND SYSTEM FOR AUTOMATIC PERSISTENCE OF CONTROLS IN A WINDOWING ENVIRONMENT

TECHNICAL FIELD

The present invention relates generally to a computer system for storing of data and, in particular, a system for persistently storing data of a control of a window.

BACKGROUND OF THE INVENTION

Many computer systems provide a window-based user interface through which a user can interface with a computer program. A window is an area, typically rectangular, of a display device in which the computer program displays its output. A window may contain several different types of "fields" into which the computer program can display data. For example, in one field the computer program can display a label to be viewed by a user, and in another field the computer program can echo the characters entered by a user with a keyboard. Each of these fields are typically implemented as a child window of the window in which they are contained. These child windows are also known as "controls."

FIG. 1a illustrates a window that contains controls. Because this window contains information relating to properties of a document, it is known as a property sheet. A property specifies certain characteristics of an object, such as a document. For example, the properties of a document may include name of the author and date of creation, whereas the properties of a character may include font and color. The property sheet 101 contains five property pages: general 102, summary 103, statistics 104, contents 105, and custom 106. Each property page is a child window of the property sheet and contains various controls, which are child windows of the property page. For example, the custom property page contains combobox 107, edit box 108, check box 109.

Certain windowing environments, such as Windows® by Microsoft Corporation, provide various tools to help a programmer generate programs that use windows and controls. In particular, to create a property page, such as the custom property page, a programmer uses a resource editor to define the layout and characteristics of the property page. These characteristics are stored in a resource file, which is opened and used by the computer program. Table 1 contains an excerpt of a resource file corresponding to the custom property page. This portion of the resource file contains the definition of the combobox 107, the edit box 108, the check box 109, and their associated labels. Each line contains the definition of a control. Line 1 corresponds to the label "Type:" to the left of combobox 107 and indicates that the control is a text control (i.e., "LTEXT") and that the control is static and located at the specified location. The location represented by "[location]" in each line indicates the upper left coordinates and the lower right coordinates of the location of the control within the custom property page. Line 2 corresponds to the combobox 107, indicates that the control is a combobox (i.e., "COMBOBOX"), and contains a unique identifier for the combobox (i.e., "IDC_COMBO1"). Line 2 also indicates that the combobox has a drop down list and that when a user tabs through the controls, the tab will stop at this combobox. Line 3 corresponds to the label "Value:" and indicates that the control is a text control and is static. Line 4 corresponds to the edit box 108, indicates that the control is an edit box (i.e., "EDITTEXT"), and contains a unique identifier for the control. Line 4 also indicates that the control will scroll horizontally and that the tab will stop at this control. Line 5 corresponds to the check box 108, indicates that the control is a control (i.e., "CONTROL"), and contains a unique identifier for the control. Line 5 also contains a label for the control (i.e., "Link To Content") and indicates that the control is a check box and that the tab will stop at this control.

TABLE 1

| | | |
|---|---|---|
| BEGIN | | |
| . | | |
| . | | |
| . | | |
| 1 | LTEXT | "Type:", IDC_STATIC, [location] |
| 2 | COMBOBOX | IDC_COMBO1, [location], CBS_DROPDOWNLIST, WS_TABSTOP |
| 3 | LTEXT | "Value:", IDC_STATIC, [location], |
| 4 | EDITTEXT | IDC_EDIT1, [location], ES_AUTOHSCROLL, WS_TABSTOP |
| 5 | CONTROL | "Link To Content", IDC_CHECK1, "Button", [location] BS_AUTOCHECKBOX, WS_TABSTOP |
| . | | |
| . | | |
| . | | |
| END | | |

The use of resource files allows for various changes to be made to the arrangement and content of the controls without the need to modify the computer program that displays the controls. For example, the controls corresponding to the labels of the various boxes can be changed by simply modifying the resource file. The computer program would then be re-built (but not re-compiled). The next time the re-built computer program is executed, the program will open the resource file with the modifications and will display the modified controls.

FIGS. 1b–1d illustrate the operation of various types of controls. FIG. 1b illustrates the operation of a combobox. The combobox 107 comprises an edit box 107a and a list box 107b. When the user selects the arrow to the right of the edit box 107a, the list box 107b is displayed. The list box contains a list of the possible values that can be entered into the edit box 107a. A user can select one of the possible values from the list box 107b by selecting a value with a mouse and mouse pointer or can use the keyboard to enter a value directly into the edit box 107a. FIG. 1c illustrates the operation of an edit box. The user can type in any information into an edit box, subject to editing performed by the underlying computer program. FIG. 1d illustrates the operation of a check box. The check box 109 can be checked or unchecked by a user using a mouse and mouse pointer.

Typical computer programs allow for persistent storage of data entered into the various controls of a property page. Such data is typically persistently stored in a file on disk. Each computer program controls the retrieving of the values from the various controls and the storing of the values within the file. Thus, each developer of a computer program that persistently stores the values of the controls needs to develop code that implements such storing.

Typical computer programs use hard-coded values (i.e., defined in the source code) for the various list boxes, including for the list box of a combobox. Thus, to change the content of a list box, a developer would change and recompile the source code. Such changes of the source code are error prone and costly.

SUMMARY OF THE INVENTION

The present invention provides a control method and system for altering the values of controls displayed within a window. The control system has resource information that contains a definition of each control within the window. For each control, the control system determines whether a buddy control is associated with the control. The buddy control has buddy control information and preferably has no visible manifestation when the window is displayed. When the control has a buddy control, the control system retrieves the buddy control information and displays the retrieved information as part of the control. A user can then modify the definition of the buddy control by modifying the buddy control information so that when the control is subsequently displayed, the modified buddy control information is displayed. The modified buddy control information is preferably displayed without modifying the computer program that controls the displaying of the window. Also, the buddy control is preferably adjacent to the control. Moreover, when the control is a list box, the buddy control information is a list of items to be displayed in the list box.

In another aspect the control system provides a general mechanism for passing parameter data to a computer program to affect a behavior of the computer program. The computer program has a window and resource information defining controls within the window. The control system defines a parameter control within the resource information in which the parameter control has no visible effect on the display of the window and contains parameter data to be passed to the computer program. The computer program retrieves the definition of the parameter control from the resource information, extracts the parameter data from the retrieved definition, and performs the behavior indicated by the parameter data so that the behavior of the computer program can be changed by changing the definition of the control. The parameter data preferably contains a key for persistently storing a value for a control or contains information to be displayed when a control is displayed, such as a list of items to be displayed in a list box.

DETAILED DESCRIPTION OF THE INVENTION

The present invention provides a control method and system for persistently storing user-entered values for controls and for modifying various controls. In a preferred embodiment, the control system defines a window class and, for each type (e.g., combobox, text box) of control, a control class. These classes provide functionality for persistently storing control values and for modifying the content of controls. A computer program that uses the control system instantiates a window object to manage the window that contains the controls, and the window object instantiates a control object for each control to manage the control. When the window is first displayed, the window object requests each control object to load the control value from the persistent storage. When a user indicates to apply the current control values (e.g., clicking an "OK" button), the window object requests each control object to store the control value in the persistent storage. Thus, the control values are persistently stored and then are retrieved when the window is displayed. The persistent storage is preferably the system registry provided by the MICROSOFT WINDOWS® operating system. However, other persistent storage such as a data base or a file may be used.

Figure 1A:
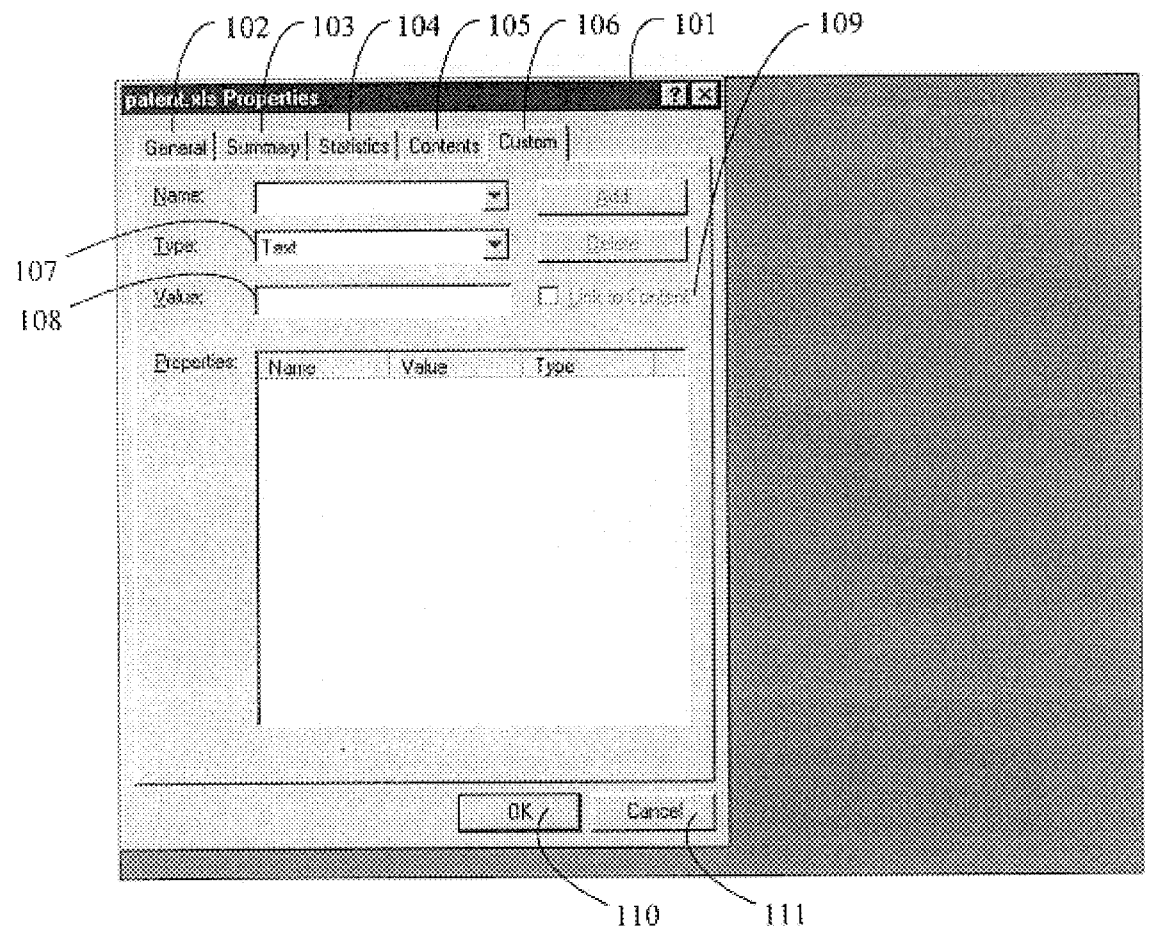
FIG. 1a illustrates a window that contains controls.
Figure 1B:
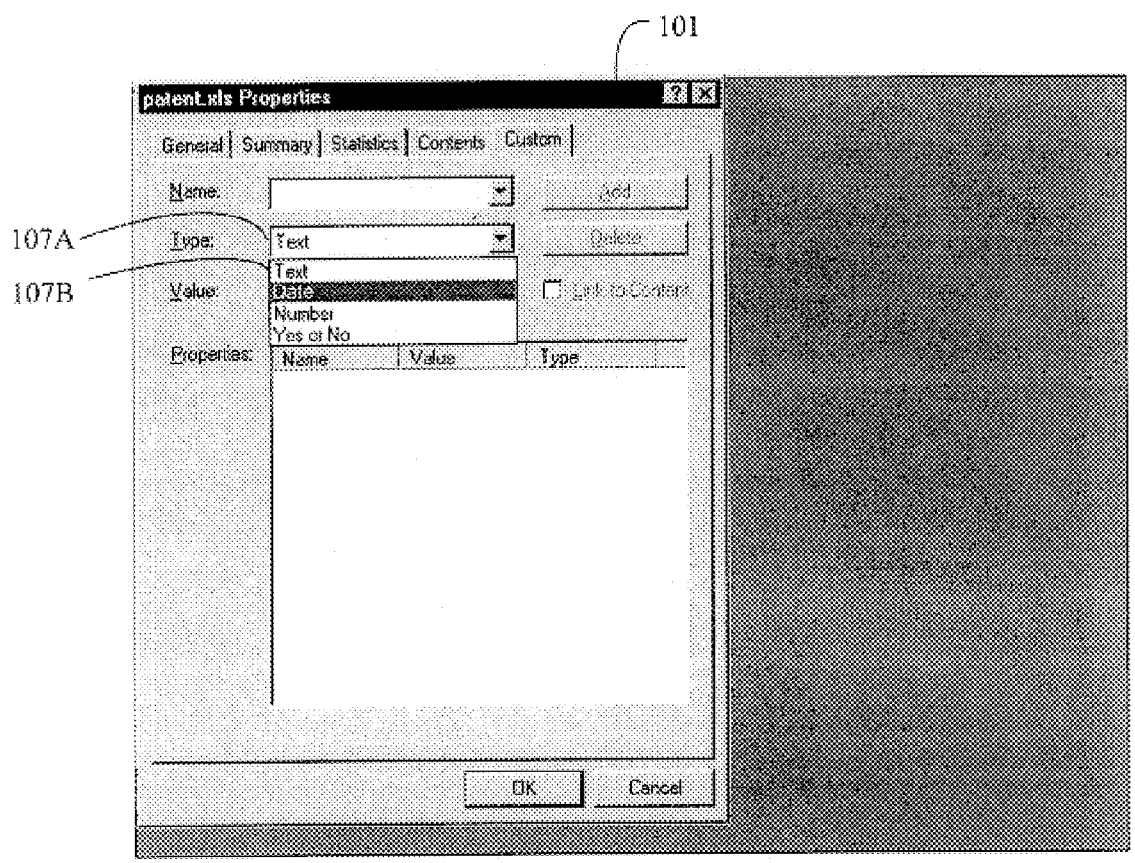
FIG. 1b illustrates the operation of a combobox.
Figure 1C:
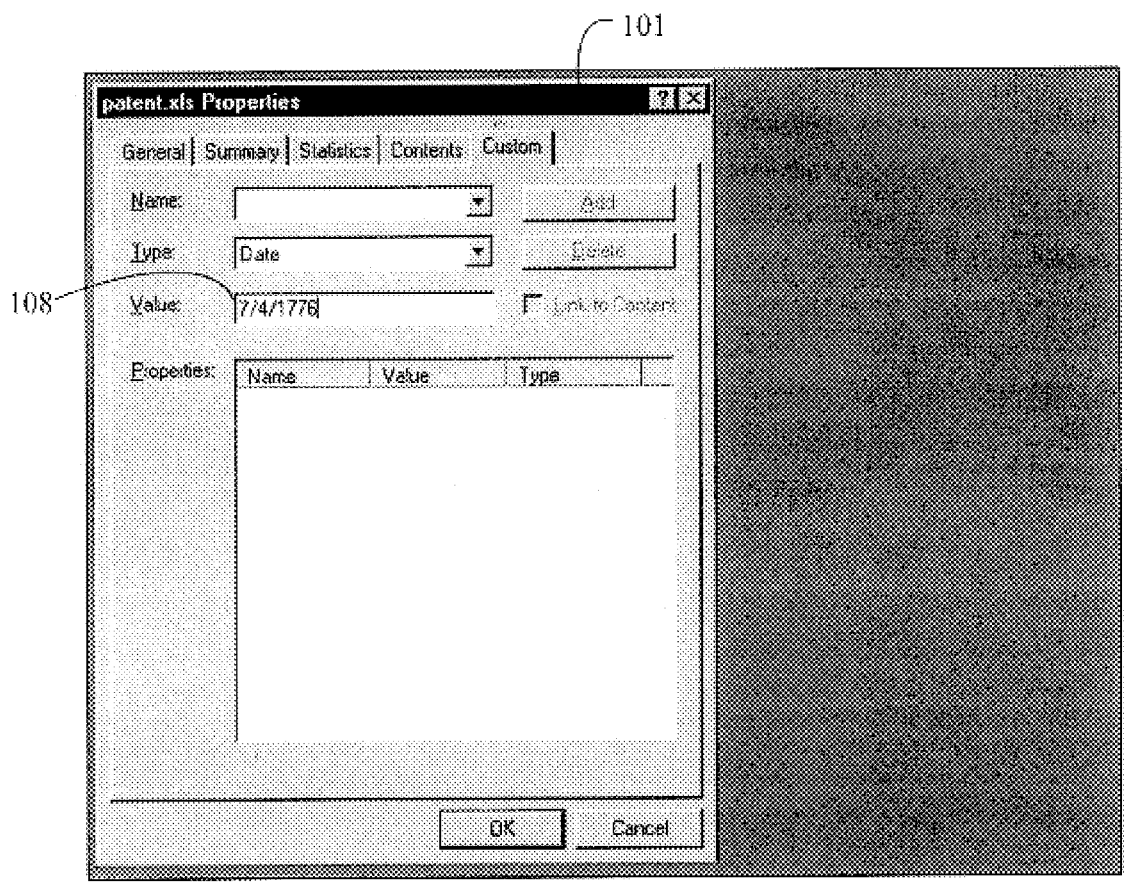
FIG. 1c illustrates the operation of an edit box.
Figure 1D:
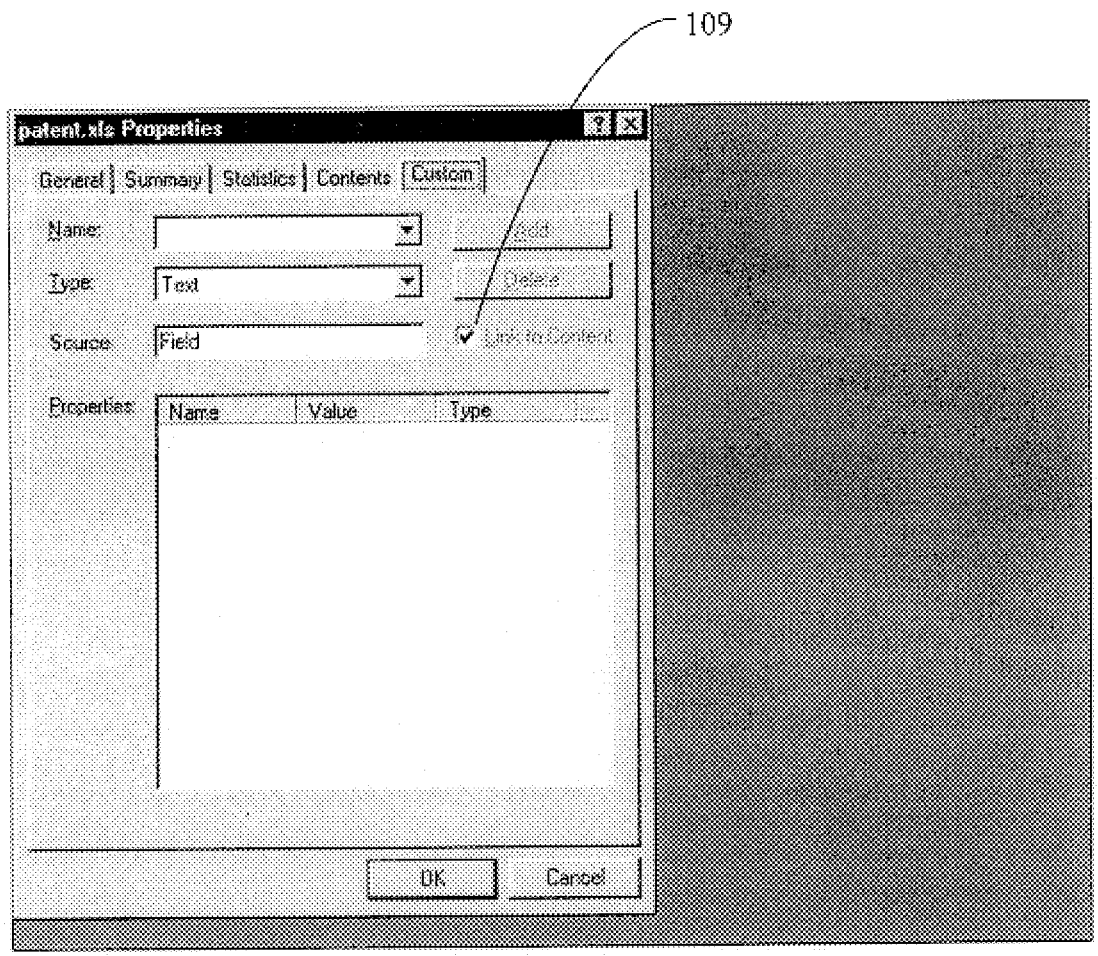
FIG. 1d illustrates the operation of a check box.

To persistently store the control values, the control system preferably assigns a unique key to each control and uses that key to store and retrieve the control value. In one embodiment, the unique key can include a combination of program identifier, window identifier, and control identifier. Thus, the control system generates such a unique key when the value for a control is stored and regenerates the same key when the value is retrieved. The generation of such a combination, however, means that the control system would not be able to retrieve the value stored for a control that is moved from one window to another. In particular, before the control is moved, the control system would generate a key based on the identifier of the current window. After the control is moved, the system would generate a new key based on the identifier of the new window. However, with this new key, the value stored with the other key cannot be retrieved. For example, the control system may assign a key of "Custom\DC_COMBOBOX1" to the combobox 107 of FIG. 1a because its window has the title "Custom" and the combobox has an identifier of "IDC_COMBOBOX1." Thus, the value of the combobox would be stored with that key. However, if the combobox were moved to the window with the title "General," then when the general window is displayed, the key "General\DC_COMBOX1" would be generated. Using this key, the control system would try to retrieve the persistently stored value for the combobox. However, since the control was moved, the key is incorrect and the persistently stored value would not be retrieved.

To address this problem of incorrect key generation, the control system provides a mechanism which allows each control to be assigned a key that is independent of the window in which the control is contained. With such a window-independent key, a control can be moved to a different window and the value that was persistently stored before the control was moved can still be retrieved. The mechanism allows the window-independent key to be stored in the resource file along with the definition of the control. In one embodiment, the definition of a control can be expanded to include an indication of the key for the control. For example, a parameter could be added to a line that defines a control to specify the window-independent key. Such an expansion of the definitions could be accomplished by performing a re-specification of the format of the resource file.

In a preferred embodiment, a window-independent key is specified without a re-specification of the format of the resource file. The control system uses a "buddy control" associated with each control that contains the window-independent key as its text (e.g., the unique identifier in the resource file). The buddy control for a specified control is defined in the resource file as a static and a not visible text control that immediately follows the specified control. Thus, the control object for the specified control can determine if a buddy control is defined by retrieving the next control and determining whether it is a static and a not visible text control. If a buddy control is defined, then the text of that buddy control specifies the key that is to be used when storing and retrieving the value for the specified control. Moreover, since the buddy control is not visible, it does not affect the appearance of the window.

In addition to specifying the key, the presence or absence of a buddy control can be used as a flag to indicate whether the value of a control should be persistently stored. That is, if no buddy control is defined for a certain control, then the value for that control would not be stored persistently. Conversely, if a buddy control is defined, then the value would be persistently stored using the specified key. In general, the use of a buddy control can be used as a mechanism to provide information to the computer program about the corresponding control. Moreover, the use of a control that does not affect the appearance of a window provides a generic mechanism for providing arbitrary information to a computer program.

In certain situations, the assignment of a unique key to each control may result in an unacceptable overhead. For example, the accessing of the registry may involve a disk access for each key. Thus, a preferred control system allows values for certain types of controls to be combined and stored with a single key. In one embodiment, the values for all the button controls of a window are combined and stored under a single key. However, when such values are combined, the corresponding controls cannot be readily moved to a different window. Thus, the decision to implement such combining of values would entail considerations of the savings in access versus the loss in the ability to easily move controls to a different window. In a preferred embodiment, the control system can be implemented to combine all values for all controls of certain types for all windows of the computer program and to store the combined values with a single key. In this way, the control could be moved to different windows and their persistently stored values could be retrieved.

The control system also allows for the items in a list box to be specified without hard-coding the item into the computer program. In particular, the items of a list box can be stored as the text of a buddy control. Thus, a control object for a list box can determine if a buddy control is defined. If one is defined, then the control object can fill the list box with the items indicated in the text.

Table 2 illustrates the use of buddy controls defined in a resource file. As illustrated in this example, the control system automatically stores all control values for comboboxes and check boxes persistently. The control system combines each of these control values and stores them with a single key. The control system uses the presence or absence of a buddy control for an edit box as a flag to indicate whether the value for the edit box should be persistently stored. If a buddy control is present, then its text contains the key for use in storing and retrieving the control value for the edit box. Also, if a combobox has a buddy control, the control system interprets the text of the buddy control as containing the items for the list box of the combobox. Line 2a defines a buddy control for the combobox defined in line 2. The text of this buddy control contains a list of the items for the list box of the combobox. Line 4a defines a buddy control for the edit box defined in line 4. The text of this buddy control contains the key for use when storing and retrieving the value of the edit box.

TABLE 2

BEGIN

| | | |
|---|---|---|
| 1 | LTEXT | "Type:", IDC_STATIC, [location] |
| 2 | COMBOBOX | IDC_COMBO1, [location], CBS_DROPDOWNLIST WS_TABSTOP |
| 2a | LTEXT | "Text\nDate\nNumber\nYes or No", IDC_STATIC, [location], Not WS_VISIBLE \| WS_DISABLED |
| 3 | LTEXT | "Value:", TDC_STATIC, [location], |
| 4 | EDITTEXT | IDC_EDIT1, [location], ES_AUTOHSCROLL, WS_TABSTOP |
| 4a | LTEXT | "HKLM, System\CurrentControlSet\Services\VxD\VNetSup, ComputerName, 15", IDC_STATIC, [location], Not WS_VISIBLE \| WS_DISABLED |

TABLE 2-continued

| 5 | CONTROL | "Link To Content", IDC_CHECK1, "Button", BS_AUTOCHECKBOX, WS_TABSTOP |
|---|---|---|
| . | | |
| . | | |
| . | | |
| END | | |

Figure 2:
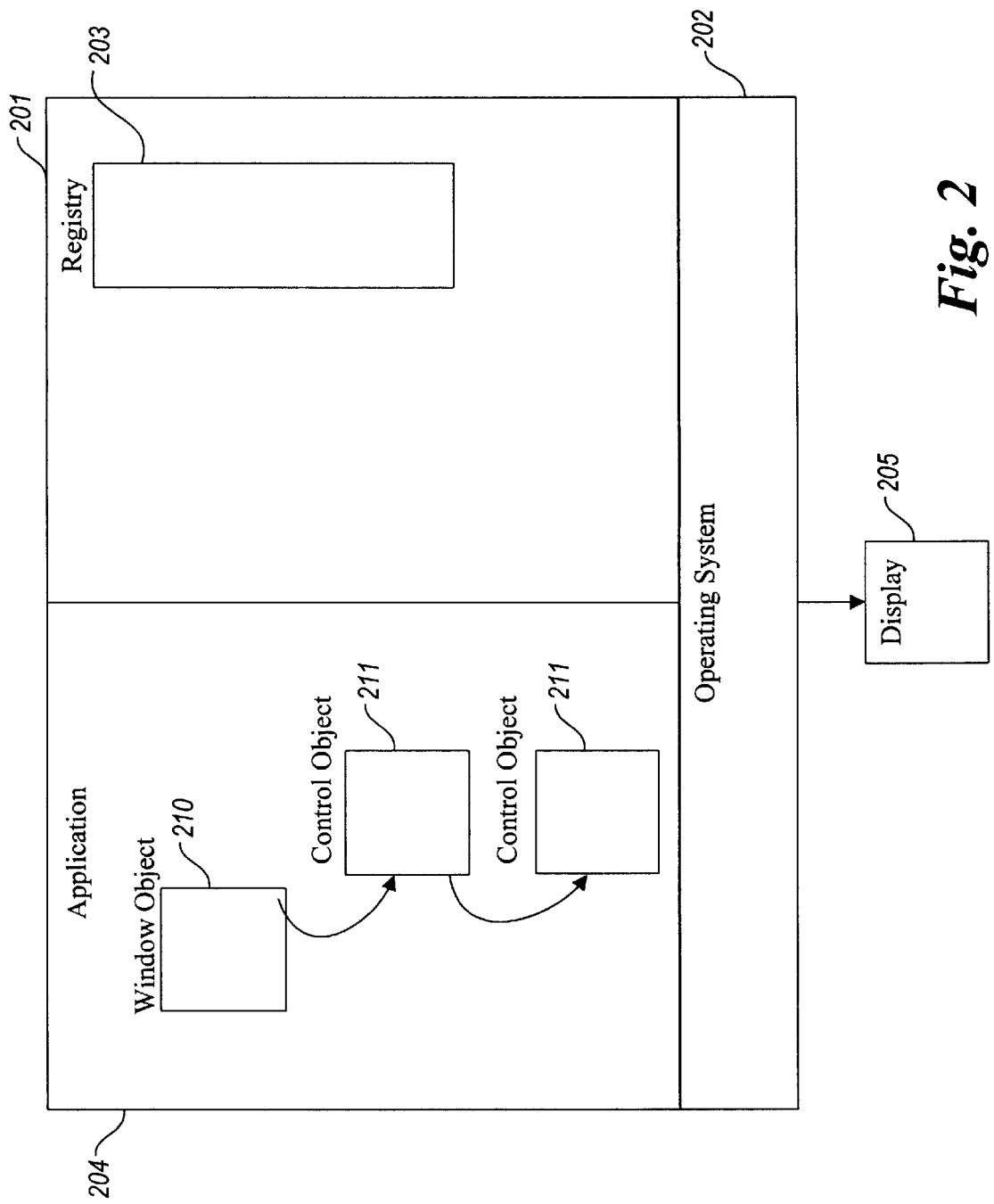
FIG. 2 is a block diagram illustrating a computer system upon which the present invention may be practiced.

FIG. 2 is a block diagram illustrating a computer system upon which the present invention may be practiced. The computer system 201 comprises a central processing unit, memory, and storage devices, such as a disk drive. The computer system also includes an operating system 202, a registry 203, an application program 204, and a display 205. The control system is typically stored in a computer-readable medium, such as a disk or read-only memory, from which it is loaded into memory for execution. The operating system coordinates the overall operation of the computer system and acts as an interface between the application program and the various devices, such as the display. The registry provides a centralized mechanism through which various application programs can store information persistently. In a preferred embodiment, the information in a registry is hierarchically organized based on a path name (i.e., key) to the data. The registry could be implemented using a database or by storing the information in a file. The application program controls the displaying of various windows. For each window, such as a property page, the application program instantiates a window object 210 having functionality for managing display of the window. The application program also includes a control object corresponding to each control on the window for managing the control. The present invention is preferably implemented as various C++ classes, which define the window and control objects.

Figure 3:
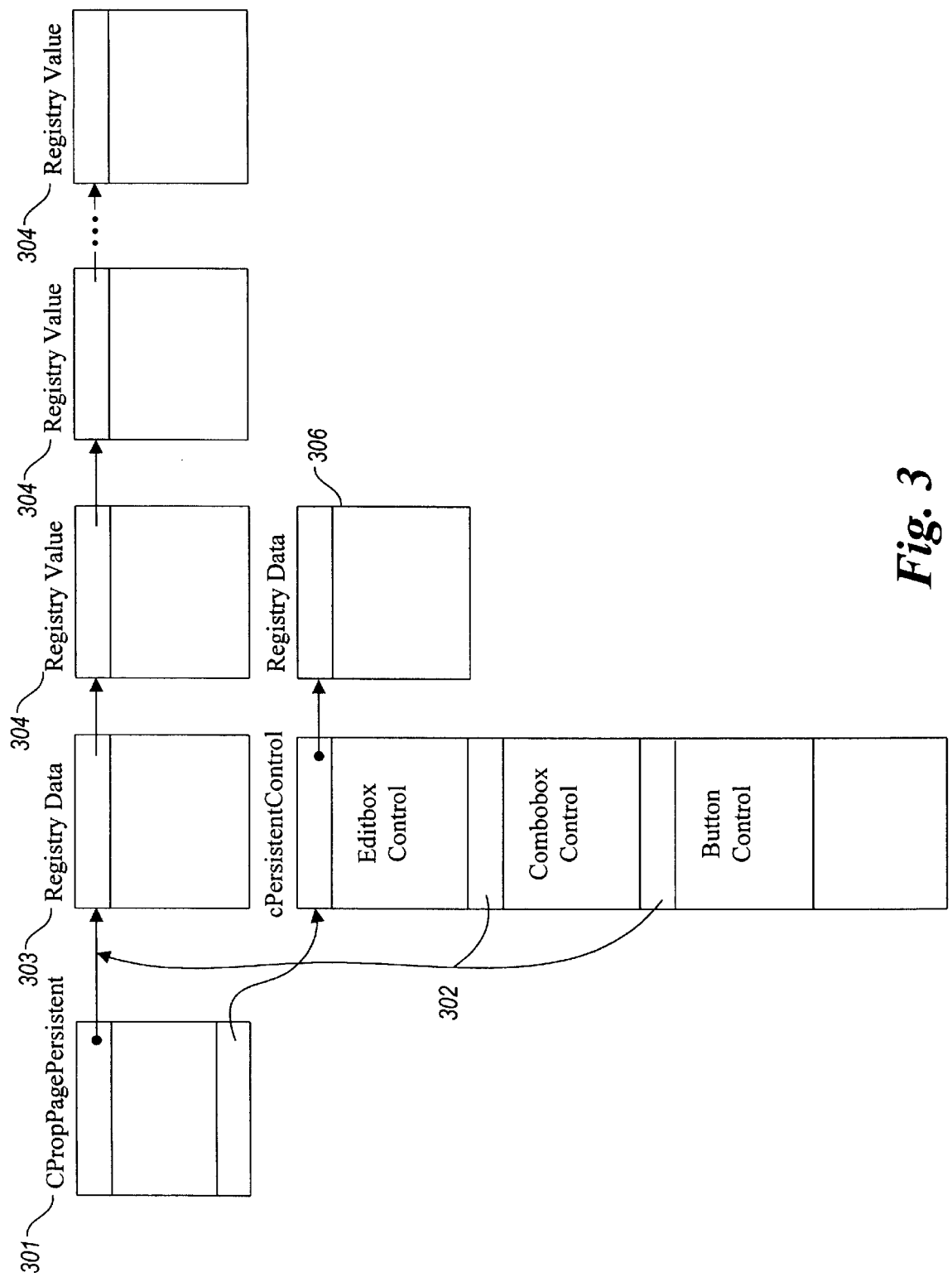
FIG. 3 is a block diagram illustrating various data structures used in a preferred embodiment.

FIG. 3 is a block diagram illustrating various data structures used in a preferred embodiment. In the following, the invention is described based upon an implementation of the window as a property page. Windowing systems, such as the MICROSOFT WINDOWS, define standard window and control classes to control the standard operation of the windows and controls, and in particular, a property page and its controls. In a preferred embodiment, the window and control classes of the control system inherit these defined classes and add functionality to implement the various aspects of the invention. In one embodiment, each property page has a corresponding CPropPagePersistent object 301 in memory, which is an instance of the CPropPagePersistent class that inherits the standard property page class. The CPropPagePersistent object contains a pointer to a list of CPersistentControl objects. Each control within the property page has a corresponding CPersistentControl object which is an instance of the CPersistentControl class that inherits the standard control class. The CPersistentControl class is subclassed based on control type: edit box (CPersistentEditControl), combobox (CPersistentComboControl), and button (CPersistentButtonControl). That is, one subclass corresponds to an edit box, another subclass corresponds to a combobox, and the other subclass corresponds to a button. The CPropPagePersistent object also contains a pointer to registry data 303. The registry data 303 contains information to be stored in the registry at a single key. In this example, the values for each combobox and button on the property page are combined and stored with a single key. Thus, all the combobox and button values for a single property page are stored with one key. When a CPropPagePersistent object directs a CPersistentComboControl or CPersistentButtonControl object to persistently store its value, the object stores its value in a registry value structure 304. After the CPropPagePersistent object directs all the control objects to persistently store their values, the CPropPagePersistent object combines and persistently stores all the control values in the registry value structure 304. Each CPersistentEditControl object contains a pointer to registry data 306. The registry data 306 contains the unique key that was retrieved from the buddy control, if present, for the corresponding CPersistentEditControl object.

FIGS. 4–8 illustrate flow diagrams for various methods of the CPropPagePersistent class. The CPropPagePersistent class has a method BaseDlgProc for processing window messages sent to the property page window, a method DoCommand for indicating that the value of a control has changed, a method SetActive for initializing the values of the controls to the persistently stored values, a method Display for displaying the property page, and a method Apply for persistently storing the values of the controls. The CPropPagePersistent class contains a data member indicating whether a value of a control has changed and thus indicating whether the values need to be persistently stored.

Figure 4:
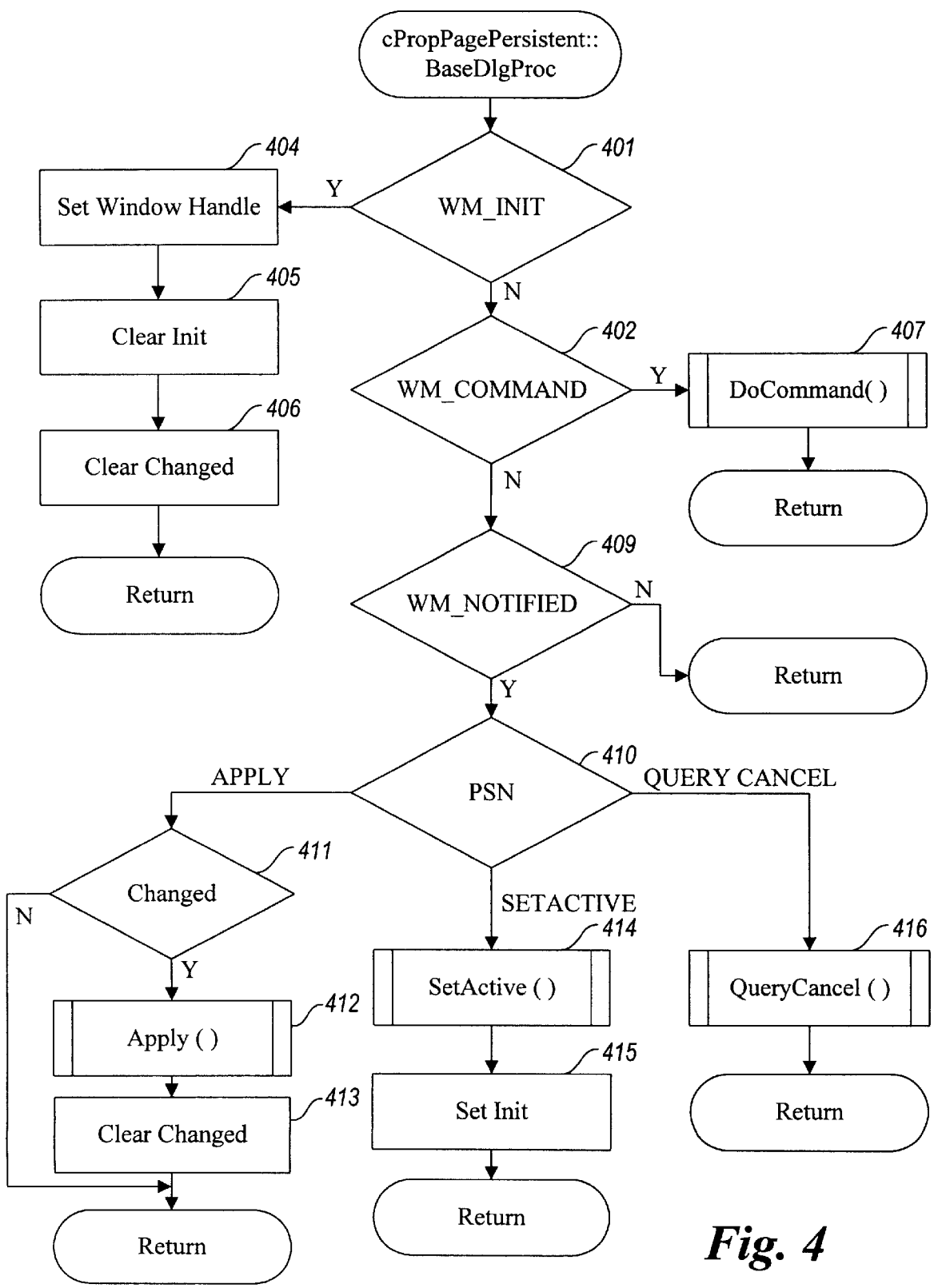
FIG. 4 is a flow diagram of the method BaseDlgProc of the CPropPagePersistent class.

FIG. 4 is a flow diagram of the method BaseDlgProc of the CPropPagePersistent class. The method serves as a window procedure for the property page window. The method is passed various messages and processes the messages. The method receives an initialization message ("WM_INIT") indicating that the property page should be initialized, a command message ("WM_COMMAND") indicating that a value of a control has been changed, and a notify message ("WM_NOTIFY") indicating whether the property page is being displayed for the first time ("SETACTIVE"), whether the OK button has been selected ("APPLY"), or whether the cancel button has been selected ("QUERYCANCEL"). The implementation of this method is preferably inherited from the standard property page class. In step 401, if the message is an initialize message, the method continues at step 402, else the method continues at step 404. In steps 404–406, the method stores the passed handle for the window associated for this object and clears the changed and initialization flags. This passed handle is stored so that the other methods of the CPropPagePersistent object can identify the corresponding property page window. In step 402, if the message is a command message, then the method continues at step 407, else the method continues at step 409. In step 407, the method calls the method DoCommand of this CPropPagePersistent object and returns. In step 409, if the message is a notify message, then the method continues at step 410, else the method returns. In step 410, if the notify is an APPLY message, then the method continues at step 411. If the message is a SETACTIVE message, then the method continues at step 414. If the message is a QUERYCANCEL message, then the method continues at step 416. In step 411, if a control value of the property page has been changed, then the changes are to be persistently stored and the method continues at step 412, else the method returns. In step 412, the method invokes the method Apply of this CPropPagePersistent object to store the control values in the registry. In step 413, the method clears the changed flag to indicate that the control values have not changed since being last persistently stored and then returns. In step 414, the method invokes the method SetActive of this CPropPagePersistent object. In step 415, the method sets the initialization flag to indicate that the property page has been initialized and then returns. In step 416, the method invokes the method QueryCancel of this CPropPagePersistent object and then returns.

Figure 5:
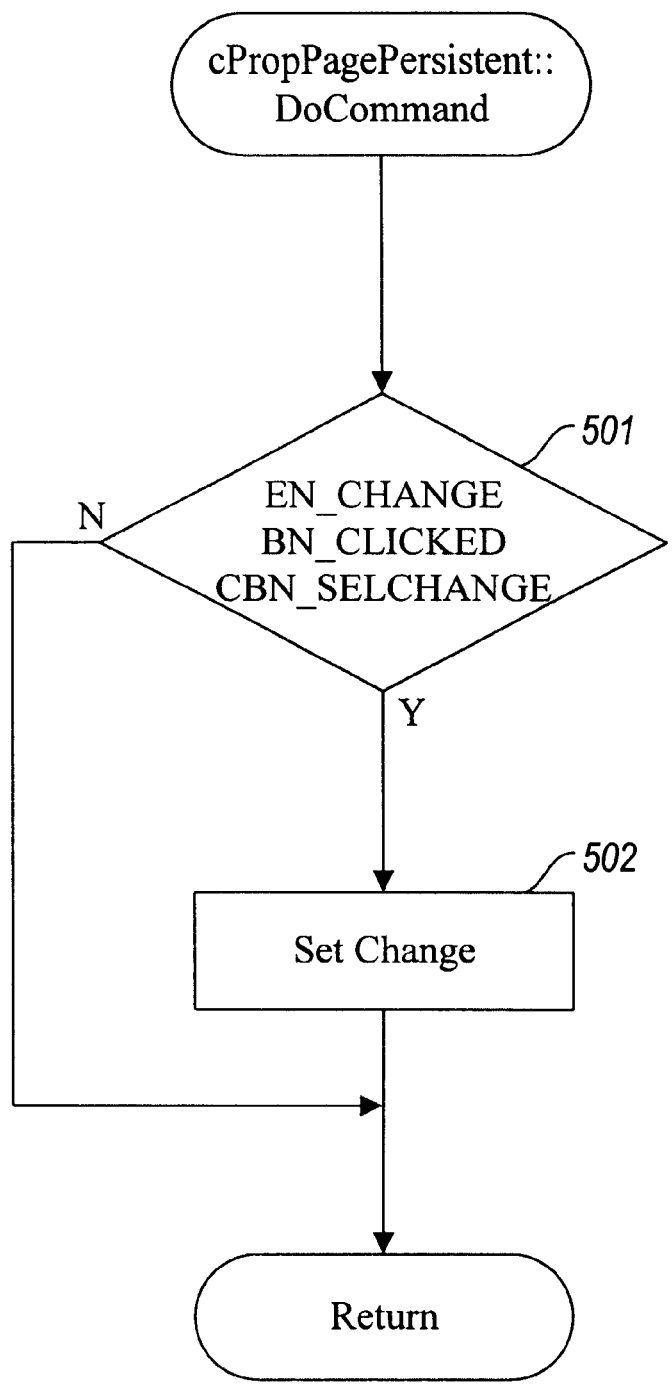
FIG. 5 is a flow diagram of the method DoCommand of the CPropPagePersistent class.

FIG. 5 is a flow diagram of the method DoCommand of the CPropPagePersistent class. The method sets the change flag if a value of a control has changed. In step 501, if a control value has changed as indicated by the message received by the property page window procedure, then the method sets the change flag in step 502. The method then returns.

Figure 6:
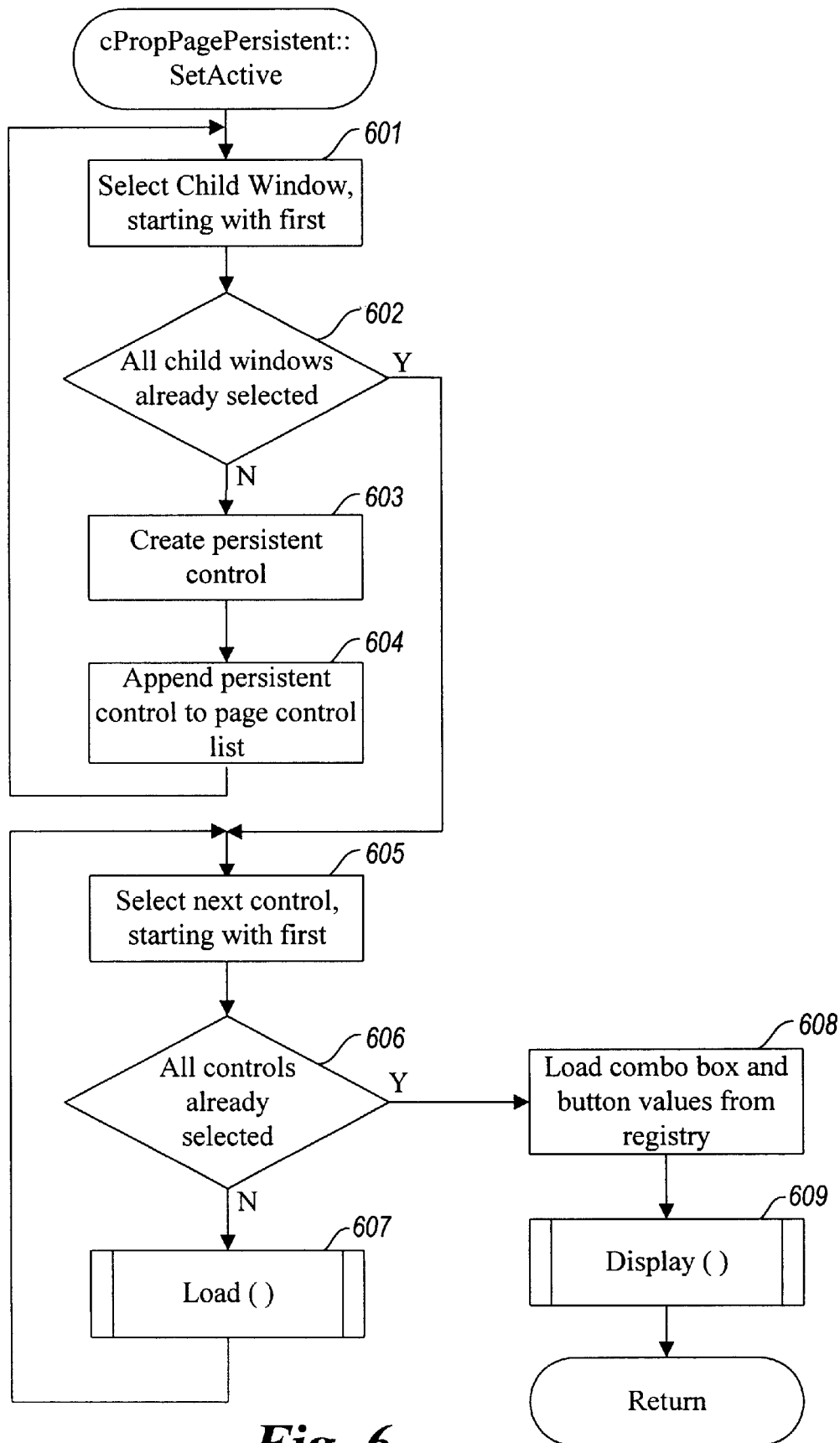
FIG. 6 is a flow diagram of the method SetActive of the CPropPagePersistent class.

FIG. 6 is a flow diagram of the method SetActive of the CPropPagePersistent class. This method manages the retrieving of the persistently stored value for each control of the property page, the initializing of the controls of the property page with the retrieved values, the initializing of the list boxes, and the displaying of the controls. Initially, the method checks the initialize flag to determine whether this CPropPagePersistent object has already been initialized and returns if it has been. In steps 601–604, the method loops creating a CPersistentControl object for each control of the property page of the appropriate subclass. In step 601, the method selects a control of the property page starting with the first. In step 602, if all the controls have already been selected, then the method continues at step 605, else the method continues at step 603. In step 603, the method creates a CPersistentControl object of the appropriate subclass for the type of the selected control. In step 604, the procedure adds the created CPersistentControl object to the list of control objects maintained by the CPropPagePersistent object. In steps 605–607, the method loops selecting each control object and directing the CPersistentControl object to load its value from persistent storage. In step 605, the method selects the next CPersistentControl object starting with the first. In step 606, if all the CPersistentControl objects have already been selected, then the method continues at step 608, else the method continues at step 607. In step 607, the method invokes the method Load of the selected CPersistentControl object and loops to step 605 to select the next CPersistentControl object. In step 608, the method loads from the registry all the values that were combined together to store with a single key for the property page. In step 609, the method invokes the method Display of this CPropPagePersistent object to display the controls and then returns.

Figure 7:
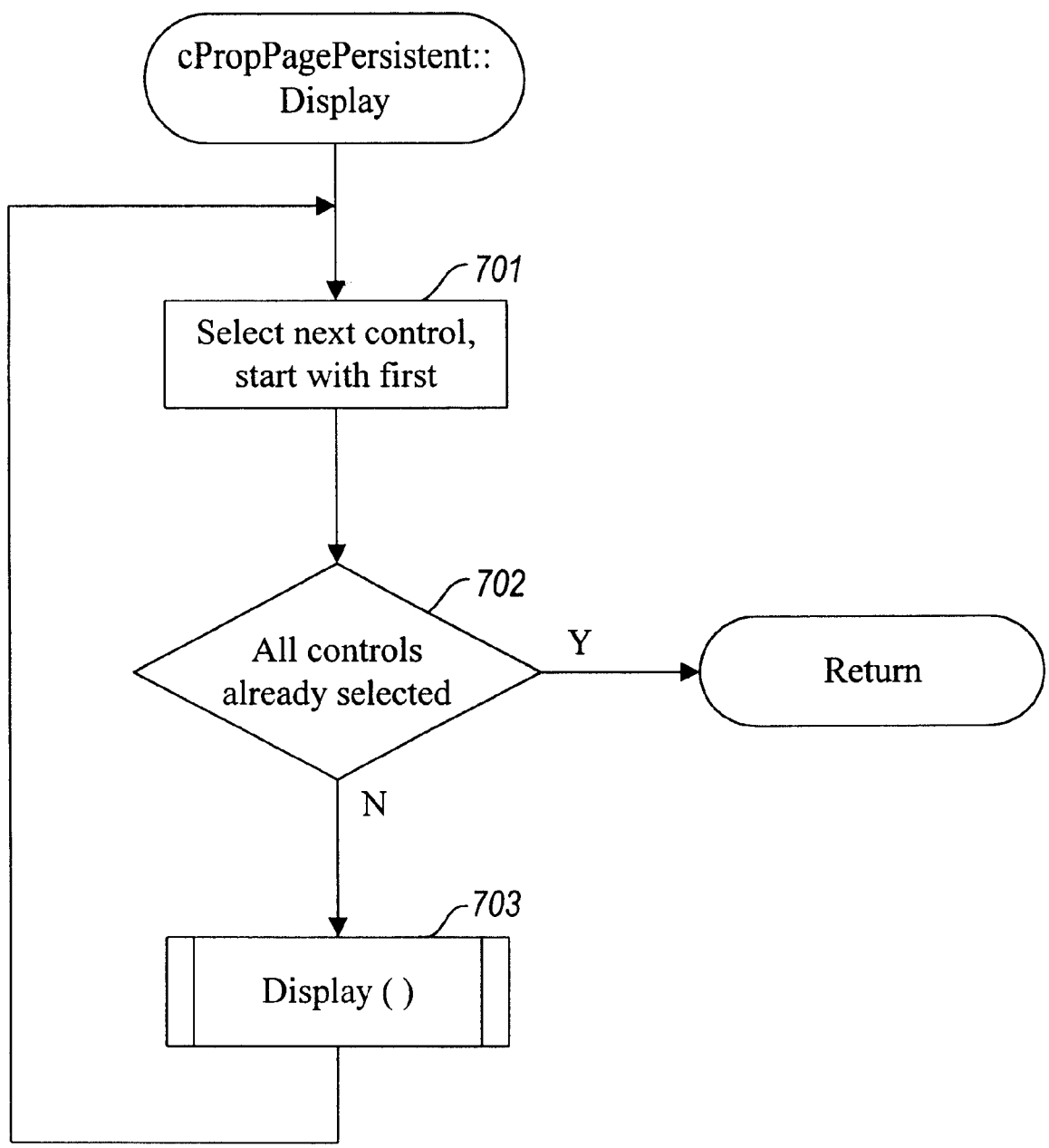
FIG. 7 is a flow diagram of the method Display of the CPropPagePersistent class.

FIG. 7 is a flow diagram of the method Display of the CPropPagePersistent class. The method loops selecting each CPersistentControl object and invokes its method Display. In step 701, the method selects the next CPersistentControl object starting with the first. In step 702, if all the CPersistentControl objects have already been selected, then the method returns, else the method continues at step 703. In step 703, the method invokes the method Display of the selected CPersistentControl object and loops to step 701 to select the next CPersistentControl object.

Figure 8:
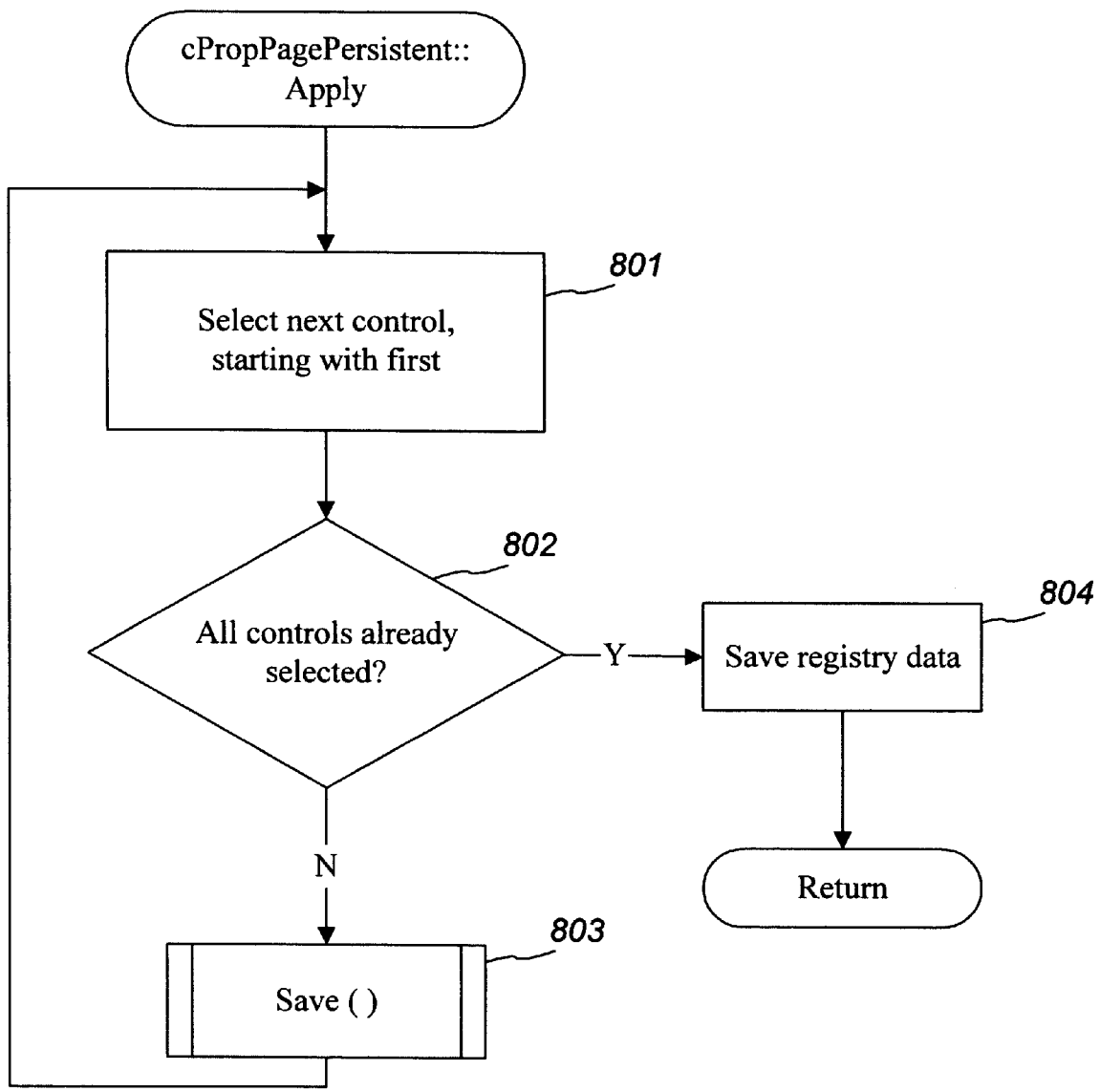
FIG. 8 is a flow diagram of the method Apply of the CPropPagePersistent class.

FIG. 8 is a flow diagram of the method Apply of the CPropPagePersistent class. The method loops selecting each CPersistentControl object and invokes its method Save to persistently store its value. In step 801, the method selects the next CPersistentControl object starting with the first. In step 802, if all the CPersistentControl objects have already been selected, then the method continues at step 804, else the method continues at step 803. In step 803, the method invokes the method Save of the selected CPersistentControl object and loops to step 801 to select the next CPersistentControl object. In step 804, the method stores in the registry all the values combined together and then returns. When the method Save is invoked in step 803 for a combobox or a button control, that method Save stored the control value in a registry value structure 304 so that the CPropPagePersistent object could access and combine the control values for persistent storage.

Figure 9:
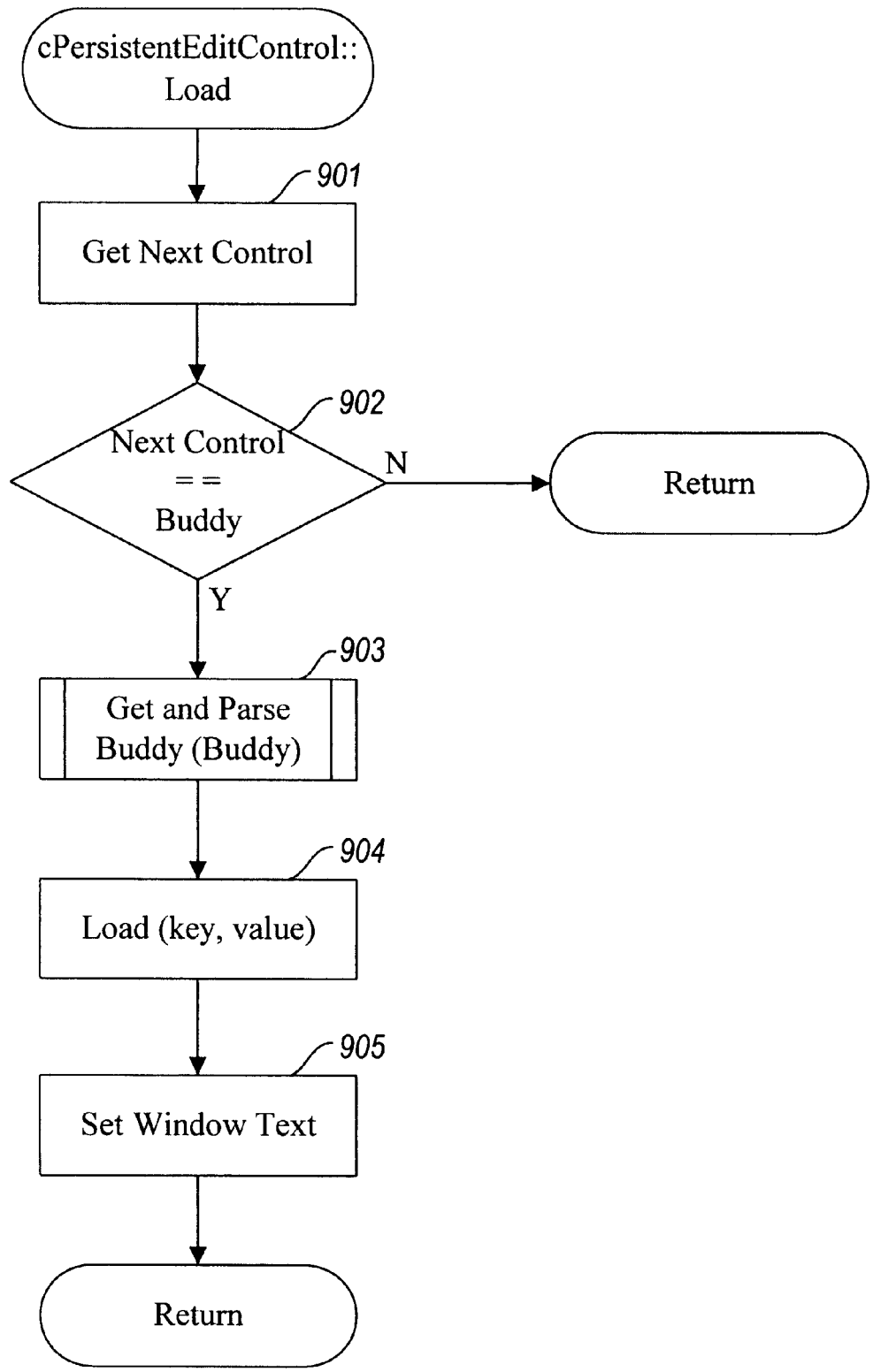
FIG. 9 is a flow diagram of the method Load of the CPersistentEditControl class.

FIG. 9 is a flow diagram of the method Load of the CPersistentEditControl class. This method parses the text of the buddy control, if present, to determine the key for this control. The method then retrieves the value from the registry and initializes the control to that retrieved value. (The method Save of the CPersistentControl subclasses operate in an analogous manner to the method Load for the subclasses.) In step 901, the method retrieves the definition of the next control from the resource file. In step 902, if the next control is a buddy control, then the method continues at step 903, else the method returns. In step 903, the method invokes the method GetAndParseBuddy of this CPersistentEditControl object to identify the key for this control. In step 904, the method retrieves the control value from the registry using the key. In step 905, the method sets the text in the control to the retrieved value and returns.

Figure 10:
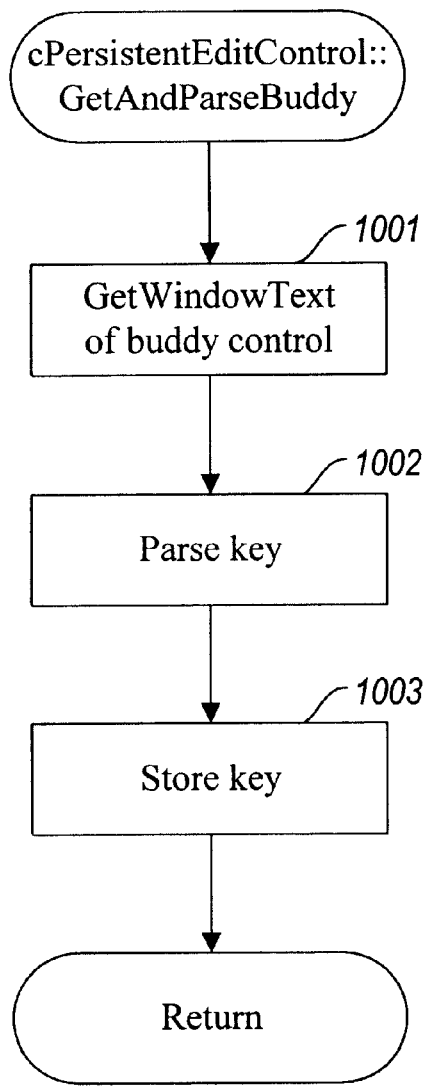
FIG. 10 is a flow diagram of the method GetAndParseBuddy of the CPersistentEditControl class.

FIG. 10 is a flow diagram of the method GetAndParseBuddy of the CPersistentEditControl class. The method retrieves the text associated with the buddy control and parses the text to identify the key. In step 1001, the method retrieves the text for the buddy control. In step 1002, the method parses the key from the text. In step 1003, the method stores the key and returns.

Figure 11:
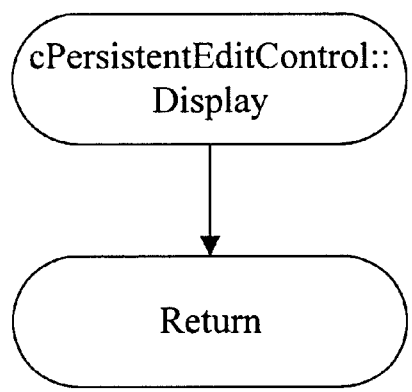
FIG. 11 is a flow diagram of the method Display of the CPersistentEditControl class.

FIG. 11 is a flow diagram of the display method of the CPersistentEditControl class. This method simply returns. The display is handled when the text is loaded.

Figure 12:
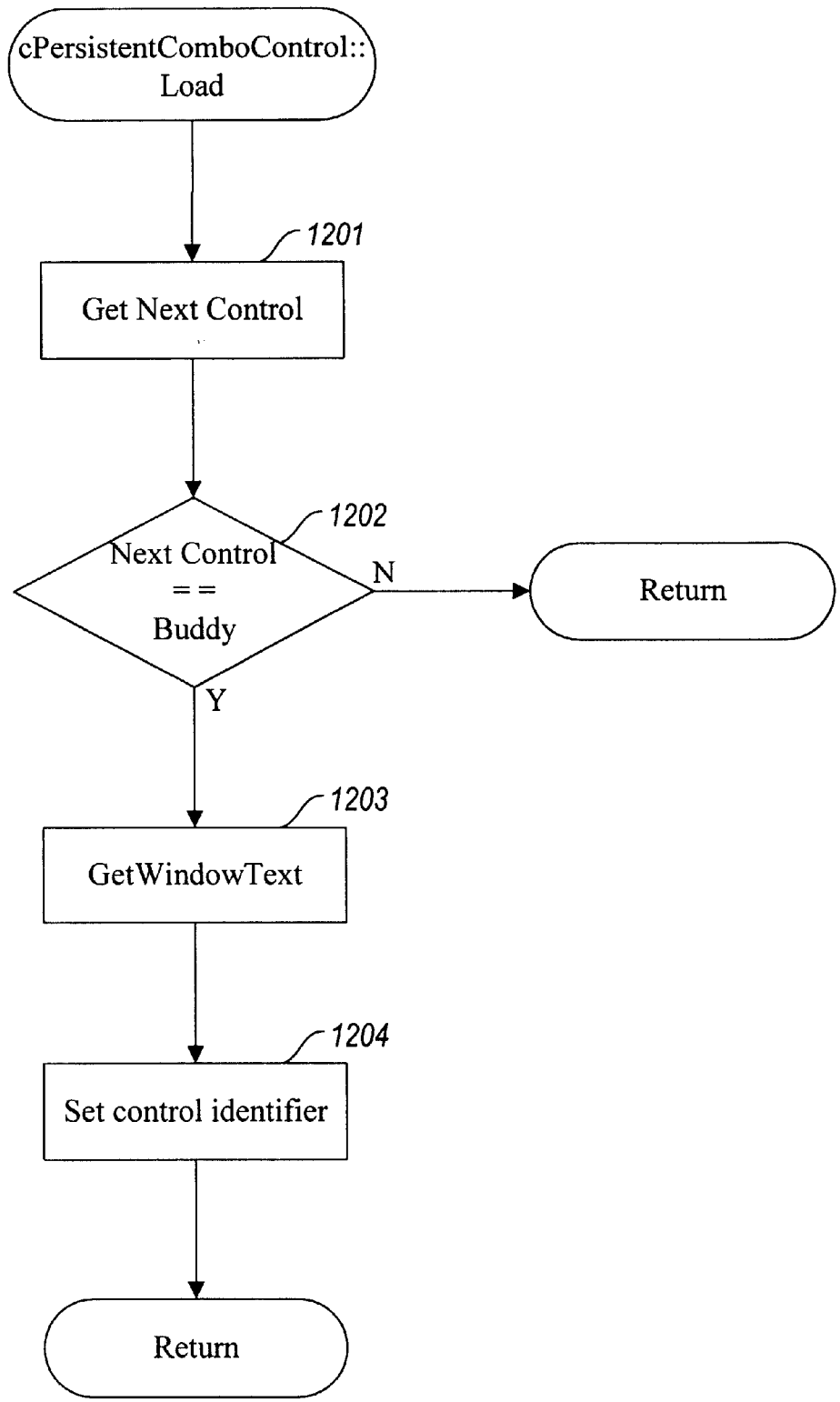
FIG. 12 is a flow diagram of the method Load of the CPersistentComboControl class.

FIG. 12 is a flow diagram of the method Load of the CPersistentComboControl class. If a combobox has a buddy control, then that buddy control contains a list of the items for the list box of the combobox. In step 1201, the method retrieves the next control. In step 1202, if the next control is a buddy control, then the method continues at step 1203, else the method returns. In step 1203, the method retrieves the text for the buddy control. In step 1204, the method adds the identification of this CPersistentComboControl object to a registry value structure 304 so that the CPropPagePersistent object can retrieve its value from the combined values. The stored values for a combobox is preferably an index into the list of items.

Figure 13:
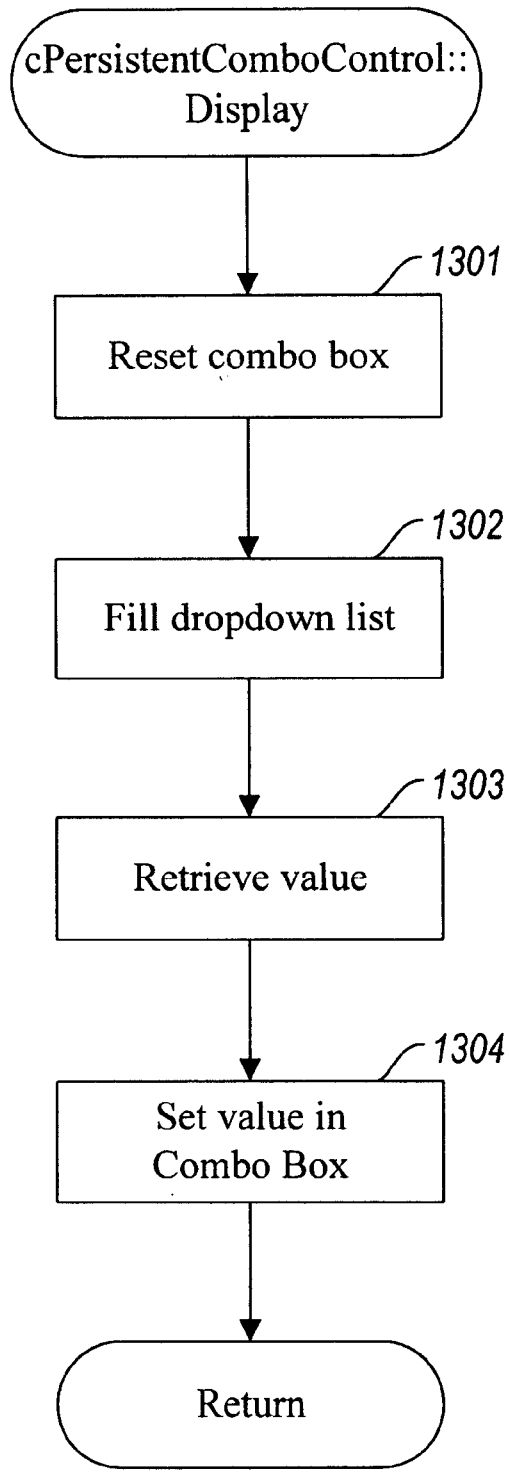
FIG. 13 is a flow diagram of the method Display of the CPersistentComboControl class.

FIG. 13 is a flow diagram of the method Display of the CPersistentComboControl class. This method fills the listbox based on the window text of the buddy control of this CPersistentComboControl object and sets its value to the value retrieved from the combined values by the CPropPagePersistent object. In step 1301, the method resets the edit box and list box of the combobox. In step 1302, the method fills the list box with the list of items from the buddy control. In step 1303, the method retrieves the value for the edit box from a registry value structure 304. In step 1304, the method sets the retrieve value into the edit box and returns.

Figure 14:
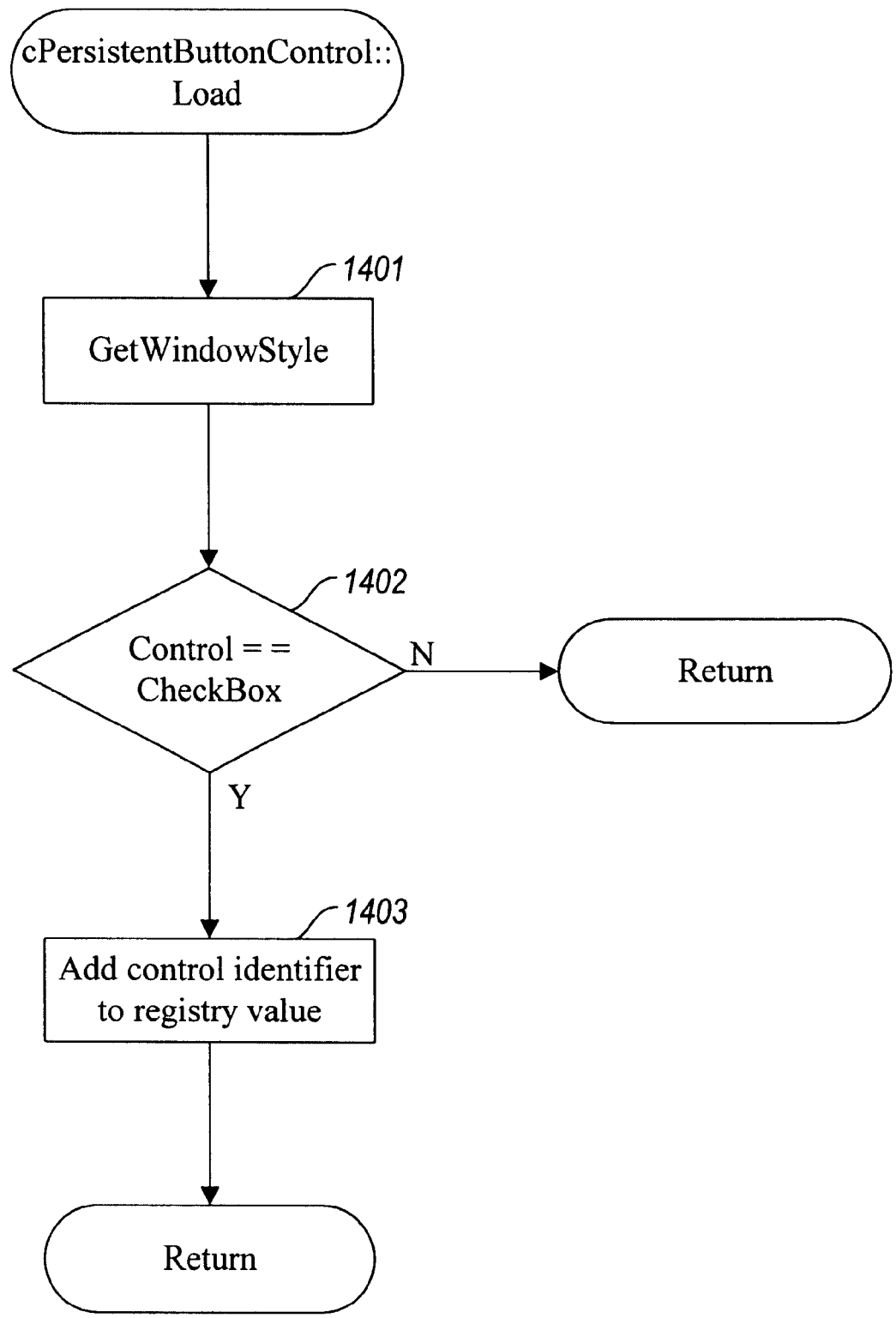
FIG. 14 is a flow diagram of the method Load of the CPersistentButtonControl class.

FIG. 14 is a flow diagram of the method Load of the CPersistentButtonControl class. This method determines whether the control is a check box, and, if so, adds its identifier to a registry value structure 304 so that the CPropPagePersistent object can retrieve its value. In step 1401, the method retrieves the style of the window from the resource file. In step 1402, if the control is a check box, then the method continues at step 1403, else the method returns. In step 1403, the method adds the identifier of the control to a registry value structure and returns.

Figure 15:
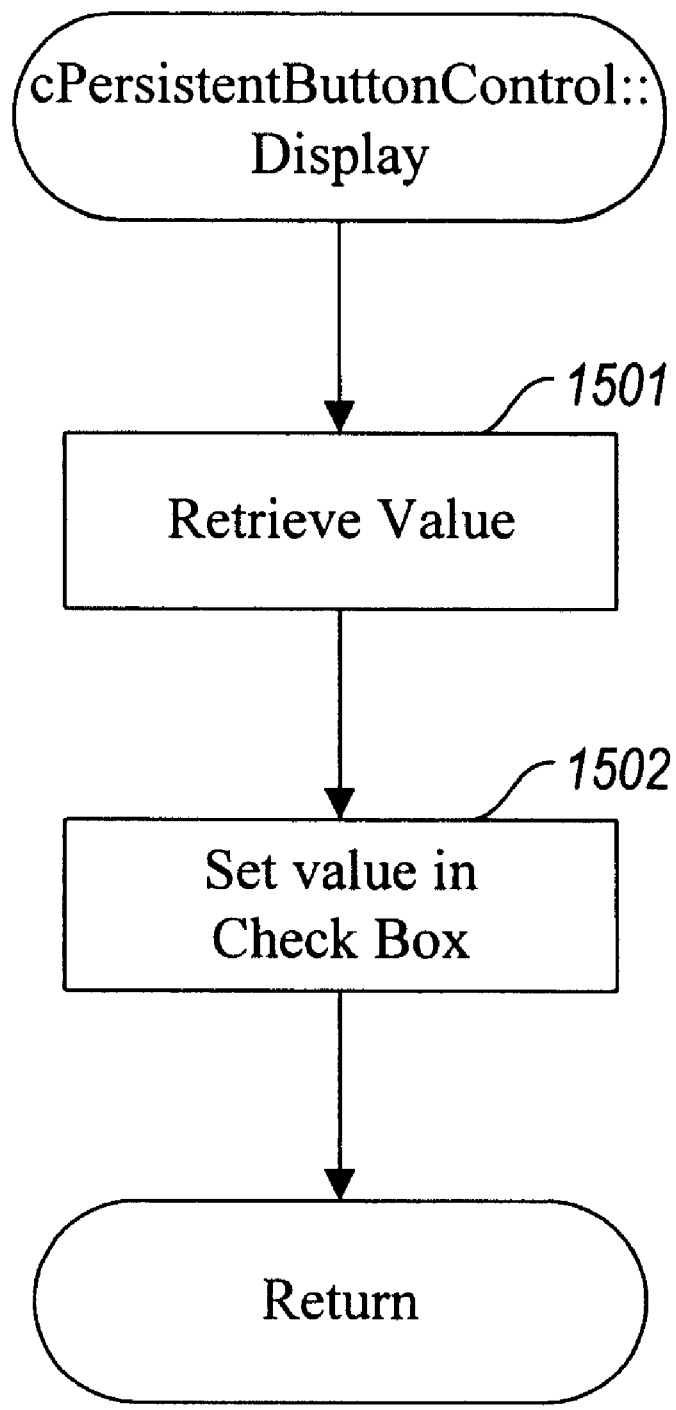
FIG. 15 is a flow diagram of the method Display of the CPersistentButtonControl class.

FIG. 15 is a flow diagram of the method Display of the CPersistentButtonControl class. This method retrieves its value from a registry value structure 304 and sets the check box accordingly. In step 1501, the method retrieves the registry value. In step 1502, the method sets the check box to the retrieved value and returns.

Although the present invention has been described in terms of a preferred embodiment, it is not intended that the invention be limited to these embodiments. Modifications within the spirit of the invention will be apparent to those skilled in the art. The scope of the present invention is defined by the claims that follow.

What is claimed is:

1. A method in a computer system for selectively and persistently storing control values for runtime-visible controls displayed at runtime as user interface elements of a window, the method comprising:
    defining resource information describing the runtime-visible controls in a format for representing user interface elements of the window and informational controls in a format for representing user interface elements of the window;
    displaying the runtime-visible controls defined in a format for representing user interface elements of the window in accordance with the defined resource information; and
    for each runtime-visible control defined in a format for representing a user interface element to be displayed as a control of the window,
        determining whether that runtime-visible control defined in a format for representing a user interface element has an associated information control defined in a format for representing user interface elements of the window in the resource information; and
        persistently storing the control value of the runtime-visible control responsive to determining the runtime-visible control has an associated information control defined in a format for representing user interface elements of the window in the resource information;
    wherein information controls are used to indicate whether control values of associated runtime-visible controls should be persistently stored.

2. The method of claim 1 wherein the information control defined in a format for representing user interface elements of the window contains a key for use when persistently storing the control value.

3. The method of claim 1 wherein the information control defined in a format for representing user interface elements of the window is a buddy control of the associated control and is defined at a location in the resource information adjacent to the associated control.

4. The method of claim 1 wherein the information control defined in a format for representing user interface elements of the window is not displayed as a control when the window is displayed.

5. A computer-readable medium containing computer-executable instructions for performing the method of claim 1.

6. A computer system for selectively and persistently storing control values for controls of a window displayed at runtime, comprising:
    a resource file containing a definition of each of the controls displayed at runtime;
    means for displaying the window in accordance with the definition of controls within the resource file;
    means for receiving from a user control values for the controls displayed at runtime;
    means for determining whether each control to be displayed at runtime in the window as a control has an associated information control defined in the resource file in a format for representing an element of the window displayed at runtime; and
    means for persistently storing the control value received from a user for a control displayed at runtime responsive to determining that control displayed at runtime has an associated information control defined in a format for representing an element of the window displayed at runtime;
    wherein information controls are defined in a format for representing an element of the window displayed at runtime and are used to indicate whether control values of associated controls should be persistently stored.

7. The computer system of claim 6 wherein the information control defined in a format for representing an element of the window displayed at runtime contains a key for use when persistently storing the control value.

8. The computer system of claim 6 wherein the information control defined in a format for representing an element of the window displayed at runtime is a buddy control of the associated control displayed at runtime that is defined at a location in the resource information adjacent to the associated control displayed at runtime.

9. The computer system of claim 1 wherein the information control defined in a format for representing an element of the window displayed at runtime is not displayed as a control when the window is displayed at runtime.

10. A method in a computer system for displaying information in a page having a page definition containing control definitions each defining a control that may be displayed in the page, each control definition of a format for specifying elements displayable as controls in the page and defining either a visible control that is to be displayed in the page, or an invisible control that is not to be displayed in the page, the method comprising the steps of:
    for each control definition defining a visible control,
        determining whether the control definition defining a visible control is followed in the page definition by a control defining an invisible control;
        responsive to determining the control definition defining a visible control is followed in the page definition by a control definition defining an invisible control, performing (a) and (b):
            (a) obtaining a state for the defined visible control using information in the control definition defining the invisible control; and
            (b) displaying in the page the defined visible control in the obtained state; and
        alternatively, responsive to determining the control definition defining a visible control is not followed in the page definition by a control definition defining an invisible control, displaying in the page the defined visible control.

11. The method of claim 10 wherein the step of obtaining a state for the defined visible control obtains contents to be displayed within the visible control.

12. The method of claim 10 wherein the obtaining step obtains a state for the defined visible control by retrieving a direct indication of the state from the information in the control definition defining the invisible control.

13. The method of claim 10 wherein the obtaining step obtains a reference to a state source outside the information in the control definition defining the invisible control.

14. The method of claim 10 wherein the obtaining step obtains a key identifying a state source outside the information in the control definition defining the invisible control.

15. The method of claim 10, further comprising the steps of:

under the control of a user, altering the state in which a selected one of the visible controls is displayed; and storing the altered state of the selected visible control using information in the definition of the invisible control following the definition of the selected visible control.

16. The method of claim 15, further comprising the steps of, when the page is to be redisplayed:

retrieving the altered state of the selected visible control using information in the definition of the invisible control following the definition of the selected visible control; and displaying the selected visible control in the retrieved altered state.

17. The method of claim 15 wherein the storing step stores the altered state of the selected visible control in a location specified in the information in the definition of the invisible control following the definition of the selected visible control.

18. A computer-readable medium containing computer-executable instructions for performing the method of claim 10.

19. A method in a computer system for displaying information in a page having a page definition containing a plurality of control definitions of a format for specifying controls displayable in the page, the control definitions in the format for specifying controls displayable in the page and contained by the page definition including one or more visible control definitions conforming to the format for specifying controls displayable in the page and representing visible controls to be displayed as visible controls in the page at runtime, the control definitions contained by the page definition further including definitions of one or more invisible value-indicating control definitions conforming to the format for specifying controls displayable in the page and each associated with any one of the visible controls, each of the invisible value-indicating control definitions conforming to the format for specifying controls displayable in the page indicating a current value to be displayed at runtime within the any one of the visible controls with which the invisible value-indicating control definition is associated, the one or more invisible value-indicating control definitions conforming to the format for specifying controls displayable in the page representing invisible controls not to be displayed as controls in the page at runtime, the method comprising:

at runtime, for each visible control definition among the control definitions of the page definition, displaying in the page a visible control in accordance with the visible control definition; and at runtime, for each invisible value-indicating control definition among the control definitions of the page definition associated with a visible control:

obtaining a current value for the visible control with which the invisible value-indicating control definition is associated in accordance with the indication of the invisible value-indicating control definition, and displaying the obtained current value within the visible control with which the invisible value-indicating control definition is associated.

20. The method of claim 19 wherein the computer system has a configuration store, and wherein each of the invisible value-indicating control definitions is of a format for specifying controls displayable in the page and contains a configuration store key usable to retrieve and store a current value from the configuration store, and wherein said obtaining uses the configuration store key contained by the invisible value-indicating control definition to retrieve the current value for the visible control from the configuration store, the method further comprising:

in a modification of the current value for the visible control, receiving from a user a new value for the visible control; and persisting the new value for the visible control by using the configuration store key contained by the invisible value-indicating control definition of a format for specifying controls displayable in the page to store the new value in the configuration store.

21. A computer-readable medium whose contents cause a computer system to display information in a display region having a display region definition containing control definitions of a format for specifying controls displayable in the display region, the control definitions contained by the display region definition including one or more visible control definitions conforming to the format for specifying controls displayable in the display region and representing visible controls to be displayed as visible controls in the display region, the control definitions contained by the display region definition further including definitions of one or more invisible value-indicating control definitions conforming to the format for specifying controls displayable in the display region and each associated with any one of the visible controls, each of the invisible value-indicating control definitions conforming to the format for specifying controls displayable in the display region indicating a current value to be displayed at runtime within the any one of the visible controls with which the invisible value-indicating control definition is associated, the one or more invisible value-indicating control definitions conforming to the format for specifying controls displayable in the display region representing controls not to be displayed as controls in the display region at runtime, by performing:

at runtime, for each visible control definition among the control definitions of the display region definition, displaying in the display region a visible control in accordance with the visible control definition; and at runtime, for each invisible value-indicating control definition among the control definitions of the display region definition associated with a visible control:

obtaining a current value for the visible control with which the invisible value-indicating control definition is associated in accordance with the indication of the invisible value-indicating control definition, and displaying the obtained current value within the visible control with which the invisible value-indicating control definition is associated.

22. The computer-readable medium of claim 21 wherein the computer system has a configuration store, and wherein each of the invisible value-indicating control definitions is of a format for specifying controls displayable in the page and contains a configuration store key usable to retrieve a current value from the configuration store, and wherein said obtaining uses the configuration store key contained by the invisible value-indicating control definition to retrieve the current value for the visible control from the configuration store, the method further comprising:

in a modification of the current value for the visible control, receiving from a user a new value for the visible control; and persisting the new value for the visible control by using the configuration store key contained by the invisible value-indicating control definition of a format for specifying controls displayable in the page to store the new value in the configuration store.

23. A computer memory containing a data structure defining contents of a display region, the data structure comprising:

a first control definition defining a visual control that is to be displayed in the display region at runtime, the visual control defined by the first control definition being capable of assuming each of a plurality of states; and a second control definition defining a control that is not ever to be displayed as a control at runtime, the second control definition containing information indicating a current state for the visual control defined by the first control definition, wherein the second control definition is defined according to a format for specifying displayed controls;

such that the data structure may be used to display the contents of the display region at runtime by displaying in the display region the visual control defined by the first control definition in a current state obtained in accordance with the information contained by the second control definition.

24. The computer memory of claim 23 wherein the second control definition defining a control that is not ever to be displayed as a control at runtime indicates a current state for the visual control defined by the first control definition by storing a key to a configuration store, wherein the key is usable to retrieve from the configuration store a current state for the visual control defined by the first control definition.

25. The computer memory of claim 23 wherein the first control definition defines a user interface element presenting a set of choices for selection by a user in a list; and the information indicating a current state for the visual control defined by the first control definition indicates an index into the set of choices.

26. The computer memory of claim 23 wherein the first control definition defines a textbox visual control, and wherein the information contained by the second control definition defining a control that is not ever to be displayed as a control at runtime includes a configuration store key usable to retrieve from a configuration store a current value for display in the textbox visual control.

27. In a computer system, a method for presenting controls in a user interface on a display at runtime, wherein the controls comprise a visible control having a value, the method comprising:

in a resource information collection, specifying a set of control definitions in a format for specifying user interface elements presented at runtime, wherein the format for specifying user interface elements presented at runtime supports a definition for an invisible control not to be displayed on the display as a control at runtime, wherein the set of control definitions comprises a control definition for the visible control, wherein the control definition for the visible control conforms to the format for specifying user interface elements presented at runtime, and a control definition for a value-indicating control, wherein the control definition for the value-indicating control conforms to the format for specifying user interface elements presented at runtime and defines the value-indicating control as an invisible control according to the format for specifying user interface elements presented at runtime;

in the definition for the value-indicating control, storing an indication of the value of the visible control for presentation when displaying the visible control at runtime;

associating the definition of the value-indicating control with the visible control; and performing at least the following to render the user interface on the display at runtime:

determining the value-indicating control definition is associated with the visible control;

responsive to said determining the value-indicating control definition is associated with the visible control, consulting the value-indicating control definition to determine the value of the visible control; and displaying the visible control as having the value of the visible control.

28. The method of claim 27 wherein the value-indicating control definition immediately follows the user interface element control definition in a logical order;

the value-indicating control definition comprises information indicating invisibility; and said determining the value-indicating control definition is associated with the visible control comprises:

determining the value-indicating control definition comprises information indicating invisibility and is a control definition immediately following the definition of the visible control in a logical order.

29. The method of claim 27 wherein the visible control having a value is a first visible control having a first value, wherein the controls comprise a second visible control having a second value, wherein a combination of the first value and the second value can be retrieved with a single key, the method further comprising:

retrieving the combination of the first value and the second value with the single key; and determining the first value of the first visible control from the combination and determining the second value of the second visible control from the combination.

30. The method of claim 27 wherein the value-indicating control definition contains a key for locating the value of the visible control.

31. The method of claim 30 wherein the value-indicating control definition is of a format for defining a text control having a static text value to be displayed as the text control on the display if the text control is visible; and the key for locating the value of the visible control is stored as the static text value in the value-indicating control definition.

32. The method of claim 30 further comprising:

through the user interface, receiving from a user a new value of the visible control; and storing the new value of the visible control at a location indicated by the key for locating the value of the visible control.

* * * * *

UNITED STATES PATENT AND TRADEMARK OFFICE
CERTIFICATE OF CORRECTION

PATENT NO.   : 6,121,964
DATED        : September 19, 2000
INVENTOR(S)  : Andrew It is certified that error appears in the above-identified patent and that said Letters Patent is hereby corrected as shown below:

Column 12,
Line 35, "The computer system of claim 1" should read -- The computer system of claim 6 --.

Signed and Sealed this

First Day of January, 2002

Attest:

JAMES E. ROGAN
*Attesting Officer*   *Director of the United States Patent and Trademark Office*